US012712133B2

(12) United States Patent
Kawaguchi et al.

(10) Patent No.: US 12,712,133 B2
(45) Date of Patent: Aug. 18, 2026

(54) SOLID ELECTROLYTIC CAPACITOR ELEMENT, SOLID ELECTROLYTIC CAPACITOR, AND METHOD FOR MANUFACTURING SOLID ELECTROLYTIC CAPACITOR ELEMENT

(71) Applicant: Panasonic Intellectual Property Management Co., Ltd., Kadoma (JP)

(72) Inventors: Takahiro Kawaguchi, Osaka Fu (JP); Tomoyuki Taniguchi, Osaka Fu (JP); Kohei Goto, Osaka Fu (JP); Hiroaki Suzuki, Osaka Fu (JP); Hitoshi Ishimoto, Hyogo Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 18/848,352

(22) PCT Filed: Mar. 22, 2023

(86) PCT No.: PCT/JP2023/011168

§ 371 (c)(1),
(2) Date: Sep. 18, 2024

(87) PCT Pub. No.: WO2023/189924

PCT Pub. Date: Oct. 5, 2023

(65) Prior Publication Data

US 2025/0201489 A1 Jun. 19, 2025

(30) Foreign Application Priority Data

Mar. 29, 2022 (JP) ................................ 2022-054223

(51) Int. Cl.
*H01G 9/15* (2006.01)
*H01G 9/00* (2006.01)
(Continued)

(52) U.S. Cl.
CPC ........... *H01G 9/028* (2013.01); *H01G 9/0036* (2013.01); *H01G 9/10* (2013.01); *H01G 9/15* (2013.01);
(Continued)

(58) Field of Classification Search
CPC ........ H01G 9/028; H01G 9/0036; H01G 9/10; H01G 9/15; H01G 9/052; H01G 2009/05; H01G 11/56; H01G 9/00; H01G 9/035
See application file for complete search history.

(56) References Cited

U.S. PATENT DOCUMENTS 6,430,033 B1 8/2002 Mitsui et al.
2011/0211294 A1* 9/2011 Ueda ........................ H01G 9/15 29/25.03

(Continued)

FOREIGN PATENT DOCUMENTS

CN 101877281 B * 3/2013 ............... H01G 9/15
CN 112968209 A * 6/2021 ........ H01M 10/0565

(Continued)

OTHER PUBLICATIONS

CN '209 Translation (Year: 2021).*

(Continued)

*Primary Examiner* — Dion R. Ferguson
(74) *Attorney, Agent, or Firm* — WHDA, LLP

(57) ABSTRACT

Disclosed is a capacitor element including: an anode body; a dielectric layer; and a cathode portion that includes a solid electrolyte layer and a cathode lead-out layer. The solid electrolyte layer contains an ionic liquid, and includes a first solid electrolyte and a second solid electrolyte layer. The first solid electrolyte contains a self-doped conductive polymer. The second solid electrolyte layer includes: a solid electrolyte 2A; a solid electrolyte 2B; and a solid electrolyte 2C. Out of a first interface between the first solid electrolyte (Continued)

and the solid electrolyte 2A, a second interface between the solid electrolyte 2A and the solid electrolyte 2B, a third interface between the solid electrolyte 2B and the solid electrolyte 2C, and a fourth interface between the solid electrolyte 2C and the cathode lead-out layer, the second interface or the third interface has a largest distribution amount of the ionic liquid.

11 Claims, 1 Drawing Sheet

(51) Int. Cl.
*H01G 9/028* (2006.01)
*H01G 9/10* (2006.01)
*H01G 9/04* (2006.01)
*H01G 9/052* (2006.01)

(52) U.S. Cl.
CPC ......... *H01G 2009/05* (2013.01); *H01G 9/052* (2013.01)

(56) References Cited

U.S. PATENT DOCUMENTS

2022/0294009 A1* 9/2022 Uchida .................. H01G 11/56
2025/0201489 A1* 6/2025 Kawaguchi .............. H01G 9/15

FOREIGN PATENT DOCUMENTS

| | | | | | |
|---|---|---|---|---|---|
| CN | 116130754 | A | * | 5/2023 | ........ H01M 10/0565 |
| JP | 2000-68152 | A | | 3/2000 | |
| JP | 2003-173933 | A | | 6/2003 | |
| JP | 2011-181610 | A | | 9/2011 | |
| JP | 2017-17188 | A | | 1/2017 | |
| JP | 2021-532584 | A | | 11/2021 | |
| KR | 20220140281 | A | * | 10/2022 | ............. H01G 11/30 |
| WO | 2020/040851 | A1 | | 2/2020 | |
| WO | WO-2022248968 | A1 | * | 12/2022 | ............ H01M 4/624 |
| WO | WO-2024135668 | A1 | * | 6/2024 | ........... H01G 9/0036 |

OTHER PUBLICATIONS

International Search Report dated Jun. 20, 2023, issued in counterpart International Application No. PCT/JP2023/011168 (2 pages).

* cited by examiner

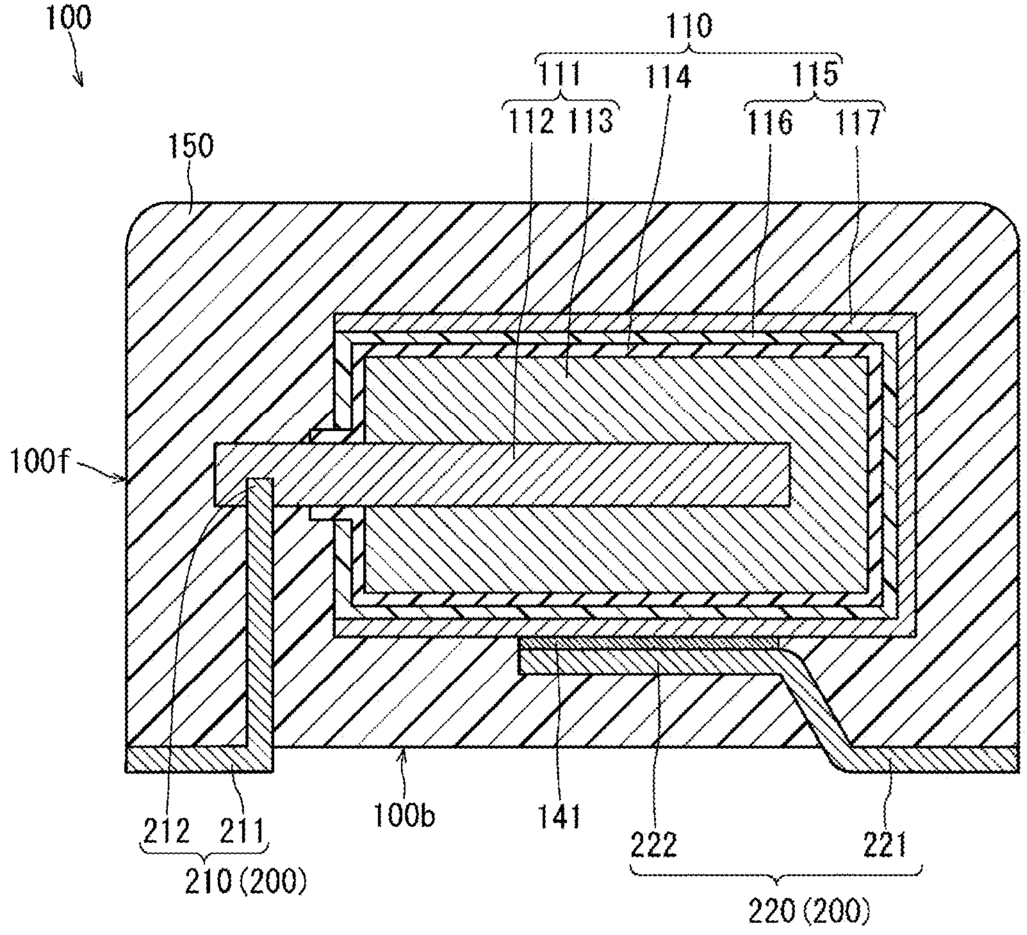
100
110
111
114
115
112 113
116 117
150
100f
212 211
210 (200)
100b
141
222
221
220 (200)

SOLID ELECTROLYTIC CAPACITOR ELEMENT, SOLID ELECTROLYTIC CAPACITOR, AND METHOD FOR MANUFACTURING SOLID ELECTROLYTIC CAPACITOR ELEMENT

CROSS-REFERENCE TO RELATED APPLICATION

This application is a National Phase Application filed under 35 U.S.C. § 371 of International Application No. PCT/JP2023/011168 filed on Mar. 22, 2023 which claims the benefit of priority under 35 U.S.C. § 119(a) of Japanese Patent Application No. 2022-054223 filed in Japan on Mar. 29, 2022, the contents of which are incorporated herein by reference.

TECHNICAL FIELD

The present disclosure relates to a solid electrolytic capacitor element, a solid electrolytic capacitor, and a method for producing a solid electrolytic capacitor element.

BACKGROUND ART

A solid electrolytic capacitor includes, for example, a capacitor element and an exterior body that seals the capacitor element. The capacitor element includes, for example, an anode body, a dielectric layer formed on a surface of the anode body and a solid electrolyte layer that coves at least a portion of the dielectric layer. The solid electrolyte layer is formed through, for example, chemical polymerization, electropolymerization, or the like, or also formed using a liquid dispersion that contains a conductive polymer (including a conjugated polymer, a dopant, and the like) in the form of particles.

Patent literature 1 proposes a method for forming an electrolytic capacitor including: preparing an anode, wherein the anode includes a dielectric formed on the anode and contains a sintered powder, and the sintered powder has at least a powder charge of 45000 μFV/g; and applying a first slurry to form a first conductive polymer layer that covers at least a portion of the dielectric, wherein the first slurry contains a polyanion and a conductive polymer, the weight ratio of the polyanion to the polymer is greater than 3, and the conductive polymer and the polyanion together form conductive particles with an average particle size of 20 nm or less.

CITATION LIST

Patent Literature

PTL 1: Japanese Laid-Open Patent Publication No. 2021-532584

SUMMARY OF INVENTION

Technical Problem

The method in which a liquid dispersion that contains a conductive polymer in the form of particles is used does not require precise control of a polymerization reaction such as chemical polymerization or electropolymerization, and it is therefore relatively easy to form the solid electrolyte layer. Also, it is relatively easy to increase the thickness of the solid electrolyte layer, and thus the withstand voltage properties of the resulting solid electrolytic capacitor can be easily enhanced. However, in the solid electrolytic capacitor, the dielectric layer has a low level of film repairability, and thus a leakage current is likely to be generated. Also, due to the low level of film repairability of the dielectric layer, the level of the obtained withstand voltage properties is also limited.

Solution to Problem

A first aspect of the present disclosure relates to a solid electrolytic capacitor element including: an anode body that includes a porous portion at least at a surface layer of the anode body; a dielectric layer formed on at least a portion of a surface of the porous portion; and a cathode portion that includes a solid electrolyte layer that covers at least a portion of the dielectric layer and a cathode lead-out layer that covers at least a portion of the solid electrolyte layer, wherein the solid electrolyte layer contains an ionic liquid, and includes a first solid electrolyte that covers at least a portion of the dielectric layer and a second solid electrolyte layer that covers at least a portion of the first solid electrolyte, the first solid electrolyte contains a self-doped conductive polymer, the second solid electrolyte layer includes: a solid electrolyte 2A that covers at least a portion of the first solid electrolyte; a solid electrolyte 2B that covers at least a portion of the solid electrolyte 2A; and a solid electrolyte 2C that covers at least a portion of the solid electrolyte 2B, and out of a first interface between the first solid electrolyte and de solid electrolyte 2A, a second interface between the solid electrolyte 2A and the solid electrolyte 2B, a third interface between the solid electrolyte 2B and the solid electrolyte 2C, and a fourth interface between the solid electrolyte 2C and the cathode lead-out layer, the second interface or the third interface has a largest distribution amount of the ionic liquid.

A second aspect of the present disclosure relates to a solid electrolytic capacitor including: at least one solid electrolytic capacitor element, the at least one solid electrolytic capacitor element being the solid electrolytic capacitor element according to the first aspect of the present disclosure; and an exterior body that seals the at least one solid electrolytic capacitor element.

A third aspect of the present disclosure relates to a method for producing a solid electrolytic capacitor element, the solid electrolytic capacitor element including: an anode body that includes a porous portion at least at a surface layer of the anode body a dielectric layer formed on at least a portion of a surface of the porous portion; and a cathode portion that includes a solid electrolyte layer that covers at least a portion of the dielectric layer and a cathode lead-out layer that covers at least a portion of the solid electrolyte layer, the method including: a first step of preparing the anode body having the dielectric layer on the surface of the porous portion; a second step of forming the solid electrolyte layer to cover at least the portion of the dielectric layer; and a third step of forming the cathode lead-out layer to cover at least the portion of the solid electrolyte layer, wherein the second step includes: a first sub-step of forming a first solid electrolyte that covers at least a portion of the dielectric layer using a first treatment solution that contains a self-doped conductive polymer; a second sub-step of forming a solid electrolyte 2A that covers at least a portion of the first solid electrolyte using a liquid dispersion 2A that contains a conductive polymer 2A; a third sub-step of forming a solid electrolyte 2B that covers at least a portion of the solid electrolyte 2A using a liquid dispersion 2B that contains a conductive polymer 2B; and a fourth sub-step of forming a solid electrolyte 2C that covers at least a portion of the solid electrolyte 2B using a liquid dispersion 2C that contains a conductive polymer 2C, the second step also includes at least one of: a fifth sub-step of applying a second treatment solution that contains an ionic liquid to a surface of the solid electrolyte 2A and drying the second treatment solution, performed between the second sub-step and the third sub-step; and a sixth sub-step of applying a third treatment solution that contains an ionic liquid to a surface of the solid electrolyte 2B and drying the third treatment solution, performed between the third sub-step and the fourth sub-step, and in the solid electrolytic capacitor element, out of a first interface between the first solid electrolyte and the solid electrolyte 2A, a second interface between the solid electrolyte 2A and the solid electrolyte 2B, a third interface between the solid electrolyte 2B and die solid electrolyte 2C, and a fourth interface between the solid electrolyte 2C and the cathode lead-out layer, the second interface or the third interface has a largest distribution amount of the ionic liquid.

Advantageous Effects of Invention

In the solid electrolytic capacitor, a leakage current can be suppressed, and an excellent withstand voltage properties can be ensued.

BRIEF DESCRIPTION OF DRAWINGS

FIG. 1 is a cross-sectional view schematically showing a solid electrolytic capacitor according to an embodiment of die present disclosure.

DESCRIPTION OF EMBODIMENTS

Novel features of the present invention are set forth in the appended claims. However, the present invention will be well understood from the following detailed description of the present invention with reference to the drawings, in terms of both the configuration and the content together with other objects and features of the present invention.

When forming a solid electrolyte layer through in-situ polymerization such as chemical polymerization or electropolymerization, during the polymerization, an additive (an Fe-based oxidant and the like) and the like may remain in the solid electrolyte layer, causing a reduction in withstand voltage properties. In contrast, with the method in which a liquid dispersion that contains a conductive polymer is used, the contamination of the additive during the polymerization can be reduced, and the thickness of the solid electrolyte layer can be easily increased. Accordingly, the method is advantageous in terms of enhancing the withstand voltage properties. However, along with the diversification of applications of solid electrolytic capacitors, they are required to have further improved withstand voltage properties. Also, in solid electrolytic capacitors, the dielectric layer has a low level of film repairability, and thus the effect of suppressing a leakage current is low.

In view of the above, (1) a solid electrolytic capacitor element according to a first aspect of the present disclosure incudes: an anode body that includes a porous portion at least at a surface layer of the anode body; a dielectric layer formed on at least a portion of a surface of the porous portion; and a cathode portion that includes a solid electrolyte layer that covers at least a portion of the dielectric layer and a cathode lead-out layer that covers at least a portion of the solid electrolyte layer. The solid electrolyte layer contains an ionic liquid, and includes a first solid electrolyte that covers at least a portion of the dielectric layer and a second solid electrolyte layer that covers at least a portion of the first solid electrolyte. The first solid electrolyte contains a self-doped conductive polymer. The second solid electrolyte layer includes: a solid electrolyte 2A that covers at least a portion of the first solid electrolyte; a solid electrolyte 2B that coves at least a portion of the solid electrolyte 2A; and a solid electrolyte 2C that covers at least a portion of the solid electrolyte 2B. Out of an interface (first interface) between the first solid electrolyte and the solid electrolyte 2A, an interface (second interface) between the solid electrolyte 2A and the solid electrolyte 2B, an interface (third interface) between the solid electrolyte 2B and the solid electrolyte 2C, and an interface (fourth interface) between the solid electrolyte 2C and the cathode lead-out layer, the second interface or the third interface has a largest distribution amount of the ionic liquid. A distribution state of the ionic liquid refers to the distribution state of the ionic liquid in an initial solid electrolytic capacitor. The initial solid electrolytic capacitor refers to a solid electrolytic capacitor that has undergone aging processing, or an unused commercially available solid electrolytic capacitor.

The solid electrolyte capacitor element is formed based on, for example, a production method including: a step (first step) of preparing an anode body that includes a dielectric layer; a step (second step) of forming a solid electrolyte layer; and a step (third step) of forming a cathode lead-out layer. The second step includes: a first sub-step of forming a first solid electrolyte; a second sub-step of forming a solid electrolyte 2A; a third sub-step of forming a solid electrolyte 2B; and a fourth sub-step of forming a solid electrolyte 2C. In the second step, the solid electrolyte layer is formed by performing at least one of: a fifth sub-step of applying a treatment solution that contains an ionic liquid to a surface of the solid electrolyte 2A and drying the treatment solution, performed between the second sub-step and the third sub-step; and a sixth sub-step of applying a treatment solution that contains an ionic liquid to a surface of the solid electrolyte 2B and drying the treatment solution, performed between the third sub-step and the fourth sub-step.

By drying the treatment solution in the fifth sub-step or the sixth sub-step, in the initial solid electrolytic capacitor, die ionic liquid can be distributed such that, out of the first to fourth interfaces, the second interface or the third interface has the largest distribution amount of the ionic liquid. Before the treatment solution is dried, the ionic liquid also permeates into more inner portions, specifically, the solid electrolyte 2A or the solid electrolyte 2B, the first solid electrolyte, and the dielectric layer. The first solid electrolyte and the dielectric layer are usually very thin in thickness, and thus, through the drying, the ionic liquid is held in the above-described interfaces, and a large amount of the ionic liquid is held in the solid electrolyte 2A or 2B. The solid electrolyte layer can be configured such that the solid electrolyte 2A or 2B has the largest distribution amount of the ionic liquid. As described above, a large amount of the ionic liquid is held in the second solid electrolyte layer that accounts for the majority of die solid electrolyte layer, and thus the resistance of the second solid electrolyte layer can be appropriately enhanced by the ionic liquid. Also, a large amount of the ionic liquid is held at a position relatively close to the dielectric layer, and thus even when a defect such as a crack is formed in the dielectric layer, by the action of the ionic liquid, the defect can be repaired, and thus a high level of film repairability is ensured. As a result of increased resistance of the second solid electrolyte layer and improved film repairability of the dielectric layer that are exerted by the ionic liquid, in the solid electrolytic capacitor, withstand voltage properties can be improved, and a leakage current can be suppressed. Also, the proportion of the ionic liquid present in the solid electrolyte 2C or outer portions of the solid electrolyte layer relative to die solid electrolyte 2C (the interface between the solid electrolyte 2C and the cathode lead-out layer, the cathode lead-out layer, and the like) is low and thus a high level of conductivity can be ensured in the solid electrolyte 2C or the outer portions of the solid electrolyte layer relative to the solid electrolyte 2C. In addition, a high level of adhesion between the solid electrolyte layer and the cathode lead-out layer can be ensured. Accordingly, the equivalent series resistance (ESR) of the solid electrolytic capacitor can be kept low, and a high electrostatic capacity can also be ensured.

Even when a sub-step of applying a treatment solution that contains an ionic liquid to the first solid electrolyte and drying the treatment solution is performed between the first sub-step and the second sub-step without performing the fifth sub-step and the sixth sub-step, the effect of suppressing a leakage current can be obtained to some extent, but it is difficult to ensure sufficient withstand voltage properties. It is considered that, even when an ionic liquid is applied in the above-described sub-step, the ionic liquid is present only in the following portions: the first interface between the first solid electrolyte and the second solid electrolyte layer; the first solid electrolyte and the dielectric layer that are very thin the pores of the porous portion of the anode body; and the like, and the ionic liquid is almost absent in the second solid electrolyte layer that accounts for the majority of the solid electrolyte layer, and for this reason, there is almost no effect of enhancing the resistance of the solid electrolyte layer exerted by the ionic liquid, and thus the effect of improving the withstand voltage properties and the effect of suppressing a leakage current cannot be obtained. Also, due to a large amount of the ionic liquid being present in the pores of the porous portion of the anode body, formation of the second solid electrolyte in die anode body may be inhibited. Also, even when a sub-step of applying a treatment solution that contains an ionic liquid to the solid electrolyte 2C or outer portions of the solid electrolyte layer relative to the solid electrolyte 2C and drying the treatment solution is performed after the fourth sub-step without preforming die fifth sub-step and the sixth sub-step, it is difficult to suppress a leakage current. Also, when a large amount of the ionic liquid is distributed in die interface between the solid electrolyte layer and the cathode lead-out layer, the interface resistance increases, which may increase the ESR or decrease the electrostatic capacity.

(2) In the item (1) described above, the second solid electrolyte layer may contain a conjugated polymer and a dopant.

(3) In the item (1) or (2) described above, out of the first interface, the second interface, the third interface, and the fourth interface, the second interface may have a largest distribution amount of the ionic liquid.

(4) In any one of the items (1) to (3) described above, in the solid electrolyte layer, the solid electrolyte 2A or the solid electrolyte 2B may have a largest distribution amount of the ionic liquid.

(5) In any one of the items (1) to (4) described above, the ionic liquid may be hydrophilic.

(6) In any one of the items (1) to (5) described above, the ionic liquid may contain $HSO_4^-$ ions.

(7) A solid electrolytic capacitor according to a second aspect of the present disclosure includes: at least one solid electrolytic capacitor element, the at least one solid electrolytic capacitor element being the solid electrolytic capacitor element in accordance with any one of the items (1) to (6) described above; and an exterior body that seals the at least one solid electrolytic capacitor element.

(8) The present disclosure also encompasses a method for producing a solid electrolytic capacitor element. The solid electrolytic capacitor element includes: an anode body that includes a porous portion at least at a surface layer of the anode body; a dielectric layer formed on at least a portion of a surface of the porous portion; and a cathode portion that includes a solid electrolyte layer that covers at least a portion of the dielectric layer and a cathode lead-out layer that covers at least a portion of the solid electrolyte layer.

The method for producing a solid electrolytic capacitor element includes: a first step of preparing the anode body haring the dielectric layer on the surface of the porous portion; a second step of forming the solid electrolyte layer to cover at least the portion of the dielectric layer, and a third step of forming the cathode lead-out layer to cover at least the portion of the solid electrolyte layer.

The second step includes: a first sub-step of forming a first solid electrolyte that covers at least a portion of the dielectric layer using a first treatment solution that contains a self-doped conductive polymer; a second sub-step of forming a solid electrolyte 2A that covers at least a portion of the first solid electrolyte using a liquid dispersion 2A that contains a conductive polymer 2A; a third sub-step of forming a solid electrolyte 2B that covers at least a portion of the solid electrolyte 2A using a liquid dispersion 2B that contains a conductive polymer 2B; and a fourth sub-step of forming a solid electrolyte 2C that covers at least a portion of the solid electrolyte 2B using a liquid dispersion 2C that contains a conductive polymer 2C.

The second step also includes at least one of a fifth sub-step of applying a second treatment solution that contains an ionic liquid to a surface of the solid electrolyte 2A id drying the second treatment solution, performed between the second sub-step and the third sub-step; and a sixth sub-step of applying a third treatment solution that contains an ionic liquid to a surface of the solid electrolyte 2B and drying the third treatment solution, performed between the third sub-step and the fourth sub-step.

In the solid electrolytic capacitor element, out of a first interface between the first solid electrolyte and the solid electrolyte 2A, a second interface between the solid electrolyte 2. A and the solid electrolyte 2B, a third interface between the solid electrolyte 2B and the solid electrolyte 2C, and a fourth interface between the solid electrolyte 2C and the cathode lead-out layer, the second interface or the third interface has a largest distribution amount of die ionic liquid.

(9) In the item (8) described above, an average particle size Da of the conductive polymer 2A, an average particle size Db of the conductive polymer 2B, and an average particle size Dc of the conductive polymer 2C may satisfy $Da \leq Db < Dc$.

(10) In the item (8) or (9) described above, none of the first treatment solution, the liquid dispersion 2A, the liquid dispersion 2B, and the liquid dispersion 2C may contain an ionic liquid.

(11) In any one of the items (8) to (10) described above, neither the second treatment solution nor die third treatment solution may contain a conductive polymer.

Hereinafter, a solid electrolytic capacitor element and a method for producing a solid electrolytic capacitor element according to the present disclosure, as well as a solid electrolytic capacitor and a method for producing a solid electrolytic capacitor according to die present disclosure, including the items (1) to (11) described above, will be described more specifically. At least one of the items (1) to (11) described above may be combined with at least one of the elements described below as long as there is no technical contradiction.

[Solid Electrolytic Capacitor]

A solid electrolytic capacitor element included in a solid electrolytic capacitor includes an anode body, a dielectric layer formed on a surface of the anode body and a cathode portion that covers at least a portion of the dielectric layer. The anode body constitutes an anode portion. Hereinafter, the solid electrolytic capacitor element may also be referred to simply as "capacitor element". In the present disclosure, there is no particular limitation on the constituent elements of the solid electrolytic capacitor, excluding a solid electrolyte layer. Accordingly, constituent elements that are used in known solid electrolytic capacitors may be used (Capacitor Element)

(Anode Portion)

The anode portion includes the anode body. The anode portion may include the anode body and an anode wire.

(Anode Body)

The anode body may contain a valve metal, an alloy that contains a valve metal, a compound that contains a valve metal, or the like. The anode body may contain one of these materials, or may contain two or more of these materials. The valve metal is preferably, for example, aluminum, tantalum, niobium, or titanium.

The anode body includes a porous portion at least at a surface layer of the anode body. The anode body includes a large number of fine pores in the porous portion. With this porous portion, the anode body has fine irregularities.

The anode body that has a porous portion at a surface layer thereof can be obtained by, for example, roughening a surface of a valve metal-containing substrate (a substrate in the form of a sheet (for example, a foil or a plate), or the like). The roughening may be performed through, for example, etching processing (electrolytic etching, chemical etching, or the like), or the like. The anode body includes, for example, a core portion and porous portions formed unitarily with the core portion on both surfaces of the core portion.

The anode body may also be a porous molded body of valve metal-containing particles or a porous sintered body of valve metal-containing particles (a sintered body formed by sintering the porous molded body, or the like). Each of the molded body and the sintered body may be in the shape of a sheet, a rectangular parallelepiped, a cube, a shape similar any of these, or the like. The porous sintered body may be, for example, a porous sintered body that contains tantalum.

(Anode Wire)

When the anode body is composed of a porous sintered body or a porous molded body, the anode portion may include an anode wire. The anode wire may be a metal wire. Examples of the material of the anode wire include the valve metals listed above, copper, copper alloys, and the like. A portion of the anode wire is embedded in the anode body, and the remaining portion of the anode wire protrudes outward from an end face of the anode body.

(Dielectric Layer)

The dielectric layer is formed to, for example, cover at least a portion of the surface of the anode body (more specifically, the porous portion). The dielectric layer is an insulating layer that functions as a dielectric. The dielectric layer is formed by anodizing the valve metal on the surface of the anode body through chemical conversion processing or the like. The dielectric layer is formed on the porous surface of the anode body, and thus the surface of the dielectric layer has fine irregularities along the shape of the porous portion.

The dielectric layer contains an oxide of a valve metal. For example, when tantalum is used as the valve metal, the dielectric layer contains $Ta_2O_5$. When aluminum is used as the valve metal, the dielectric layer contains $Al_2O_3$. However, the dielectric layer is not limited to these examples as long as the dielectric layer can function as a dielectric.

(Cathode Portion)

The cathode portion is formed to cover at least a portion of the dielectric layer formed on the surface of the anode body. The cathode portion includes at least a solid electrolyte layer that covers at least a portion of the dielectric layer. The cathode portion may include, for example, a solid electrolyte layer that covers at least a portion of the dielectric layer and a cathode lead-out layer that coves at least a portion of the solid electrolyte layer.

Hereinafter, the constituent elements of the cathode portion will be described.

(Solid Electrolyte Layer)

the solid electrolyte layer includes a first solid electrolyte that covers at least a portion of the dielectric layer and a second solid electrolyte layer that covers at least a portion of the first solid electrolyte. The solid electrolyte layer contains an ionic liquid (First Solid Electrolyte)

The first solid electrolyte contains a self-doped conductive polymer. The self-doped conductive polymer includes: for example, a conjugated polymer backbone; aid a functional group (an anionic group or the like) that functions as a dopant and is directly or indirectly bonded to the conjugated polymer backbone with a covalent bond.

The self-doped conductive polymer usually contains an anionic group. Examples of the anionic group include a sulfo group, a caboxy group, a phosphoric acid group, a phosphonic acid group, and the like. In the solid electrolyte layer, the anionic group of the self-doped conductive polymer may be contained in any one of the following forms: an anion form; a free form; an ester form; and a salt form, or may be contained in a form in which the anionic group is interacted or complexed with a component contained in the solid electrolyte layer. In the specification of the present application, any one of anionic groups in all of these forms will be referred to simply as "anionic group".

The self-doped conductive polymer may contain one type of anionic group or two or more types of anionic groups. From the viewpoint of easily ensuring a high level of conductivity of the self-doped conductive polymer, the self-doped conductive polymer may contain at least a sulfo group.

It can be said that the self-doped conductive polymer backbone is constituted of a conjugated polymer. The number of anionic groups contained in the self-doped conductive polymer may be, for example, 1 or more and 3 or less, 1 or more and 2 or less, or 1 per conjugated polymer molecule that constitutes the self-doped conductive polymer backbone.

As the conjugated polymer that constitutes the self-doped conductive polymer backbone, for example, a polymer that contains, as the basic backbone, polypyrrole, polythiophene, polyaniline, polyfuran, polyacetylene, polyphenylene, polyphenylene vinylene, polyacene, or polythiophene vinylene can be used. It is sufficient that the polymer contains at least one type of monomer unit that constitutes the basic backbone. The polymer includes a homopolymer, a copolymer composed of two or more types of monomers, and a derivative thereof (a substituent that has a substituent group, or the like). For example, the polythiophene includes poly(3,4-ethylenedioxythiophene) and the like. The self-doped conductive polymer contains an anionic group in the conjugated polymer backbone. The anionic group may be introduced directly into the conjugated polymer backbone, or indirectly via a linking group. The linking group is preferably a polyvalent group (divalent group) including an allylene group or the like. The linking group may be, for example, an aliphatic polyvalent group (divalent group or the like) such as an alkylene group, or a —$R^1$—X—$R^2$— group, where X represents an oxygen element or a sulfur element, and $R^1$ and $R^2$ ae the same or different, and each represent an alkylene group. The number of carbon atoms contained in each alkylene group included in the linking group is, for example, 1 or more and 10 or less, and may be 1 or more and 6 or less. The alkylene group may be linear or branched. The linking group may include, for example, at least an alkylene group with 2 or more carbon atoms. The number of carbon atoms in the alkylene group may be 2 or more (or 3 or more) and 10 or less, or 2 or more (or 3 or more) and 6 or less. For example, $R^1$ may represent an alkylene group with 1 or more and 6 or less carbon atoms, and $R^2$ may represent an alkylene group with 2 or more (or 3 or more) and 10 or less carbon atoms. However, the linking group is not limited to those described above.

The conjugated polymer that constitutes the self-doped conductive polymer backbone may be polypyrrole, polythiophene, or polyaniline. From the viewpoint of ease of obtaining high levels of conductivity and stability, the self-doped conductive polymer is preferably a polymer that includes: a conjugated polymer backbone that contains a monomer unit that corresponds to a thiophene compound; and an anionic group introduced into the backbone.

The thiophene compound may be a compound that contains a thiophene ring and is capable of forming a repeating structure of a corresponding monomer unit. The thiophene compound can form a repeating structure of a monomer unit by linking at the 2 and 5 positions of the thiophene ring.

The thiophene compound may contain a substituent group at, for example, at least one of the 3 and 4 positions of the thiophene ring. The substituent group at the 3 position and the substituent group at the 4 position may be linked to form a ring fused to the thiophene ring. The thiophene compound may be, for example, thiophene that may contain a substituent group at at least one of the 3 and 4 positions, or an alkylenedioxythiophene compound (a $C_{2-4}$ alkylenedioxythiophene compound such as an ethylenedioxythiophene compound, or the like). The alkylenedioxythiophene compound also includes a compound that contains a substituent group in a portion of the alkylene group.

The substituent group is preferably, but is not limited thereto, an alkyl group (a $C_{1-4}$ alkyl group such as a methyl group or an ethyl group, or the like), an alkoxy group (a $C_{1-4}$ alkoxy group such as a methoxy group or an ethoxy group, or the like), a hydroxy group, a hydroxyalkyl group (a hydroxy$C_{1-4}$ alkyl group such as a hydroxymethyl group, or the like), or the like. When the thiophene compound contains two or more substituent groups, the substituent groups may be the same or different. The thiophene ring (at least one of the thiophene ring and the alkylene group in the alkylenedioxythiophene ring) may contain, as a substituent group, an anionic group from among the anionic groups listed above or a group (for example, a sulfoalkyl group or the like) that contains the anionic group.

The self-doped conductive polymer may contain at least a conjugated polymer (PEDOT or the like) backbone that contains a monomer unit that corresponds to a 34-ethylenedioxythiophene compound (3,4-ethylenedioxythiophene (EDOT) or the like). The conjugated polymer backbone that contains at least a monomer unit that corresponds to EDOT may contain only a monomer unit that corresponds to EDOT, or may contain, in addition to the monomer unit, a monomer unit that corresponds to a thiophene compound other than EDOT.

The weight avenge molecular weight (Mw) of the self-doped conductive polymer is, but is not particularly limited to, for example, 1,000 or more and 1,000,000 or less, or may be 1,000 or more and 100,000 or less, or 5,000 or more and 50,000 or less.

In the specification of the present application, the weight average molecular weight (Mw) is a polystyrene equivalent value determined based on gel permeation chromatography (GPC). GPC is usually performed using a polystyrene gel column and water/methanol (at a volume ratio of 8/2) as a mobile phase.

The first solid electrolyte is formed using a treatment solution (first treatment solution) that contains the self-doped conductive polymer. The first treatment solution contains the self-doped conductive polymer and a liquid medium. As used herein, the term "liquid medium" refers to, for example, a medium that is in a liquid form at room temperature (for example, 20° C. or more and 35° C. or less). The first treatment solution may be a liquid dispersion prepared by dispersing the self-doped conductive polymer in the form of particles in the liquid medium, or a solution prepared by dissolving the self-doped conductive polymer in the liquid medium. The self-doped conductive polymer contains a relatively flexible polymer chain, and the position of the functional group such as an anionic group is random, and in addition thereto, the polymer chain has low orientation and low crystallinity. For this reason, as compared with a non-self-doped conductive polymer, the self-doped conductive polymer is easily dissolved in the liquid medium or easily dispersed in the form of fine particles. Accordingly, the pores of the porous portion are easily impregnated with the first treatment solution at high permeability. From the viewpoint of impregnating the pores of the porous portion with the first treatment solution at a high permeability, the concentration of the conductive polymer in the first treatment solution is preferably low. The first solid electrolyte formed is, for example, in the form of a continuous or non-continuous very thin film. For this reason, by applying an ionic liquid to the first solid electrolyte, the film repairability of the dielectric layer is enhanced to some extent, and thus a leakage current can be suppressed. However the first solid electrolyte is merely provided in a portion of the solid electrolyte layer that is on the most inner side, and thus even when there is a large amount of the ionic liquid in the first solid electrolyte or an interface (first interface) between the first solid electrolyte and the second solid electrolyte layer, the effect of enhancing the resistance of the solid electrolyte layer is unlikely to be obtained, and it is therefore difficult to ensure a high level of withstand voltage properties.

The first solid electrolyte may contain a non-self-doped conductive polymer (including a conjugated polymer, a dopant, and the like), and the like. However, in the non-self-doped conductive polymer, the conjugated polymer and the dopant interact with each other, and thus the conductive polymer particles tend to be large. For this reason, when the first treatment solution contains a non-self-doped conductive polymer, the permeability of the first treatment solution into the pores of the porous portion tends to be low. From this viewpoint, the proportion of the self-doped conductive polymer in the entire conductive polymer that constitutes the first solid electrolyte (the total amount of the self-doped conductive polymer, the conjugated polymer, and the dopant) is, for example, 75 mass % or more, and may be 90 mass % or more. The proportion of the self-doped conductive polymer in the entire conductive polymer that constitutes the first solid electrolyte is 100 mass % or less. The conductive polymer that constitutes the first solid electrolyte may be constituted only of the self-doped conductive polymer.

(Second Solid Electrolyte Layer)

The second solid electrolyte layer usually contains a non-self-doped conductive polymer (including a conjugated polymer, a dopant, and the like). The second solid electrolyte layer may contain an additive where necessary. A large amount of the ionic liquid may be contained in the second solid electrolyte layer.

The second solid electrolyte layer includes a solid electrolyte 2A that covers at least a portion of the fast solid electrolyte, a solid electrolyte 2B that covers at least a portion of the solid electrolyte 2A, and a solid electrolyte 2C that coves at least a portion of the solid electrolyte 2B. Each solid electrolyte may be in the form of a continuous or non-continuous layer. The second solid electrolyte layer is constituted of these solid electrolytes, and thus is in a layer as a whole.

Of the solid electrolytes that constitute the second solid electrolyte layer, adjacent solid electrolytes (for example, the solid electrolyte 2A and the solid electrolyte 2B, and the solid electrolyte 2B and the solid electrolyte 2C) may have different compositions. As used herein, the expression "adjacent solid electrolytes have different compositions" encompass the following cases: the case where a component (at least one selected from the group consisting of a conjugated polymer, a dopant, and an additive, or the like) contained in each solid electrolyte is different; the case where the content of the component contained in each layer is different; and the like. When each solid electrolyte includes a plurality of layers, the composition of each layer is usually the same. When each solid electrolyte includes a plurality of layers, there may be an aggregation agent (a cation component, a combination of a cation component and an anion component, or the like) between adjacent layers. The aggregation agent may be provided between the first solid electrolyte and the second solid electrolyte layer, and between adjacent ones of the solid electrolytes that constitute the second solid electrolyte layer.

The first solid electrolyte and the second solid electrolyte layer, as well as the solid electrolytes that constitute the second solid electrolyte layer can be distinguished through, for example, EPMA analysis in which a cross-sectional image is analyzed using an electron probe micro analyzer (EPMA). For example, by preforming EPMA analysis in an equidistant manner on a cross-sectional image of the entire solid electrolyte layer, the boundary between the first solid electrolyte and the second solid electrolyte layer, as well as the boundary between adjacent ones of the solid electrolytes that constitute the second solid electrolyte layer can be identified from the difference in the wavelengths of characteristic X rays obtained at the measurement points.

The conductive polymer (the non-self-doped conductive polymer or the like) contained in the second solid electrolyte layer or the solid electrolytes that constitute the second solid electrolyte layer may include, for example, a conjugated polymer (a non-self-doped conjugated polymer (for example, a conjugated polymer that does not contain an anionic group), or the like) and a dopant.

As the conjugated polymer, any of the conjugated polymers listed above as examples of the conjugated polymer that constitutes the main backbone for the self-doped conductive polymer of the first solid electrolyte or die like may be used. The conjugated polymers may be used alone or in a combination of two or more. From the viewpoint of ease of ensuring a higher level of withstand voltage properties, a non-self-doped conjugated polymer that contains a monomer unit that corresponds to a thiophene compound may also be used. As the thiophene compound that corresponds to the monomer unit of the non-self-doped conjugated polymer, any of the thiophene compounds described for the self-doped conductive polymer can be used. The non-self-doped conjugated polymer may contain a conjugated polymer (PEDOT or the like) that contains at least a monomer unit that corresponds to a 3,4-ethylenedioxythiophene compound (EDOT or the like). The conjugated polymer that contains at least a monomer nit that corresponds to EDOT may contain only a monomer unit that corresponds to EDOT, or may contain, in addition to the monomer unit, a monomer unit that corresponds to a thiophene compound other than EDOT.

As the dopant, at least one selected from the group consisting of an anion and a polyanion (a polymer anion and the like) can be used. Examples of the anion include a sulfate ion, a nitrate ion, a phosphate ion, a borate ion, an organic sulfonate ion, a carboxylic acid ion, aid the like. Examples of the dopant that generates a sulfonate ion include p-toluenesulfonic acid, naphthalene sulfonic acid, and the like. From the viewpoint of ease of obtaining higher levels of stability and withstand voltage properties, a polymer anion may also be used. As the polymer anion that contains a sulfo group, for example, a polymer-type polysulfonic acid can be used. Specific examples of the polymer anion include polyvinyl sulfonic acid, polystyrene sulfonic acid (PSS (including a copolymer, a substituent that has a substituent group, and the like)), polyinylsulfonic acid, polyacrylsulfonic acid, polymethacrylsulfonic acid, poly(2-acrylamide-2-methylpropane sulfonate), polyisoprene sulfonic acid, polyester sulfonic acid (aromatic polyester sulfonic acid and the like), and phenolsulfonic acid novolak resin. However, the dopant is not limited to the specific examples listed above. The dopants may be used alone or in a combination of two or more.

In the second solid electrolyte layer, or the solid electrolytes that constitute the second solid electrolyte layer, the amount of the dopant is, for example, 10 parts by mass or more and 1000 parts by mass or less, and may be 20 parts by mass or more and 500 parts by mass or less relative to 100 parts by mass of the conjugated polymer.

The second solid electrolyte layer and the solid electrolytes that constitute the second solid electrolyte layer may contain, in addition to the non-self-doped conductive polymer, a self-doped conductive polymer. The self-doped conductive polymer may be selected from, for example, the self-doped conductive polymers listed above for the first solid electrolyte. From the viewpoint of ease of ensuring a higher level of withstand voltage properties, the proportion of the non-self-doped conductive polymer (including the conjugated polymer and the dopant) in the entire conductive polymer contained in the second solid electrolyte layer and the solid electrolytes that constitute the second solid electrolyte layer may be, for example, 75 mass % or more, or 90 mass % or more. The proportion of the non-self-doped conductive polymer (including the conjugated polymer and the dopant) in the entire conductive polymer contained in the second solid electrolyte layer and the solid electrolytes that constitute the second solid electrolyte layer is 100 mass % or less. The conductive polymer contained in the second solid electrolyte layer and the solid electrolytes that constitute the second solid electrolyte layer may be constituted of the non-self-doped conductive polymer (including the conjugated polymer and the dopant).

(Ionic Liquid)

The ionic liquid contained in the solid electrolyte layer is synonymous with a salt in a molten state (a molten salt), and is an ionic substance that is in a liquid form at, for example, 25° C.

The cation that constitutes the ionic liquid may be, for example, a nitrogen atom-containing heterocyclic cation (imidazolium, pyrrolidinium, piperidinium, pyridinium, morpholinium, or the like), ammonium, phosphonium, sulfonium, any of derivatives thereof (a cation that has a substituent group such as an alkyl group, or the like), or the like. The cation may be an organic cation.

The anion that constitutes the ionic liquid may be a hydrogen sulfate ion ($HSO_4^-$), a sulfate ion ($SO_4^{2-}$ or —$SO_4^-$), a carboxylate anion (—COO—), a nitrate anion, a sulfonate anion (—$SO_3^-$), a phosphonate anion ($PO_3^{2-}$ or —$HPO_3^-$), or the like. Examples of acids that can generate these anions include sulfuric acid, sulfuric acid monoester (methyl sulfate and the like), carboxylic acid (acetic acid, lactic acid, benzoic acid, trifluoromethaneacetic acid, and the like), nitric acid, sulfonic acid (methanesulfonic acid, trifluoromethanesulfonic acid, bis(trifluoromethylsulfonyl) imide anion, and the like), phosphonic acid (diethylphosphinic acid and the like), derivatives thereof (a substituent that has a substituent group such as an alkyl group, a halogenated alkyl group, or a halogen atom, and the like), and the like. The anion may contain a fluorine atom. Examples of the fluorine atom-containing anion include trifluoromethaneacetic acid, trifluoromethanesulfonic acid, bis(trifluoromethylsulfonyl)imide anion, derivatives thereof that were described above, and the like.

From the viewpoint of ease of ensuring hydrophilicity of the ionic liquid, the ionic liquid preferably contains at least one type of anion selected from the group consisting of a hydrogen sulfate ion ($HSO_4^-$) and a sulfate ion ($SO_4^{2-}$ or —$SO_4^-$). Out of these, the ionic liquid preferably contains a hydrogen sulfate ion ($HSO_4^-$). When a hydrophilic ionic liquid that contains a hydrogen sulfate ion and the like is used, the permeability of the ionic liquid into the solid electrolyte is enhanced, and the ionic liquid is likely to be held between particles of the conductive polymer that constitutes the solid electrolyte. Also, the hydrophilic ionic liquid is likely to hold moisture, and due to the moisture contained in the ionic liquid, the damage restorability of the dielectric layer is likely to be improved. By the ionic liquid being held between particles of the conductive polymer in the solid electrolyte located at a position relatively close to the dielectric layer, a high level of film repairability of the dielectric layer can be ensured. Also, by the ionic liquid being held in the inner portions of the second solid electrolyte layer, a high level of withstand voltage properties can be ensured without impairing the adhesion to the cathode lead-out layer or the conductivity between the solid electrolyte layer and the cathode lead-out layer. Accordingly, withstand voltage properties can be further ensured and ESR can be kept low while suppressing a leakage current, and thus a high electrostatic capacity can be ensured.

Specific examples of the ionic liquid include 1-butyl-3-methyl imidazolium hydrogen sulfate, 1-butyl-3-methyl imidazolium bis(trifluoromethanesulfonyl)imide, 1-butyl-3-methyl imidazolium trifluoromethanesulfonic acid, and 1-ethyl-3-methyl imidazolium diethylphosphonic acid. Out of these specific examples, the hydrophilic ionic liquid encompasses 1-butyl-3-methyl imidazolium hydrogen sulfate, 1-butyl-3-methyl imidazolium trifluoromethanesulfonic acid, and 1-ethyl-3-methyl imidazolium diethylphosphonic acid. However, the ionic liquid is not limited to the specific examples listed above.

Regarding the distribution amount of the ionic liquid, the second interface or the third interface has the largest distribution amount of the ionic liquid out of the first to fourth interfaces. The distribution amount of the ionic liquid in the second interface and the distribution amount of the ionic liquid in the third interface may be about the same. The present invention also encompasses this case. By a large amount of the ionic liquid being distributed in the second interface or the third interface, as described above, the leakage current can be kept low while ensuring a high level of withstand voltage properties. In particular, when the second interface has the largest distribution amount of the ionic liquid out of the first to fourth interfaces, a higher level of film repairability can be obtained to further reduce die leakage current, and a higher level of withstand voltage properties can also be ensured.

In the solid electrolyte layer, the solid electrolyte 2A or the solid electrolyte 2B may have the largest distribution amount of the ionic liquid. As described above, by a large amount of the ionic liquid being held in the inner portions of the second solid electrolyte layer that accounts for the majority of the solid electrolyte layer, a high level of withstand voltage properties can be ensured, and the leakage current can be kept low. In addition, high levels of adhesion and conductivity between the cathode lead-out layer and the solid electrolyte layer can be ensured, and thus ESR can be kept low, and a high electrostatic capacity can be ensured. The solid electrolyte 2A and the solid electrolyte 2B may have about the same distribution amount of the ionic liquid. The present invention also encompasses this case.

The solid electrolyte layer and the solid electrolytes that constitute the solid electrolyte layer may contain an additive where necessary Examples of the additive include known additives that can be added to the solid electrolyte layer (for example, a coupling agent and a silane compound) and known conductive materials other than the conductive polymer. The solid electrolyte layer and the solid electrolytes that constitute the solid electrolyte layer may contain one or a combination of two or more of the additives listed above. As a conductive material that can be used as the additive, for example, at least one selected from the group consisting of a conductive inorganic material such as manganese dioxide and a TCNQ complex salt can be used.

(Formation of Solid Electrolyte Layer)

In a method for producing the capacitor element described above, a second step (a solid electrolyte layer forming step) includes, for example, fast to fourth sub-steps, and also includes at least one of a fifth sub-step and a sixth sub-step. Through the second step, a solid electrolyte layer is formed. Prior to the second step, an anode body that includes a dielectric layer formed on a surface of a porous portion is prepared in a first step. For details of the first step, see die description of the anode body and the dielectric layer given above. In the second to fourth sub-steps, a second solid electrolyte layer is formed. The second solid electrolyte layer and the solid electrolytes that constitute the second solid electrolyte layer can be formed using a liquid dispersion prepared by dispersing a conductive polymer in a liquid medium. In the second solid electrolyte layer, the liquid dispersions used to form the solid electrolytes 2A, 2B, and 2C will be referred to as "liquid dispersions 2A, 2B, and 2C", respectively. The conductive polymers contained in the liquid dispersions 2A, 2B, and 2C will be referred to as "conductive polymers 2A, 2B, and 2C", respectively.

(First Sub-Step)

In the first sub-step, a first solid electrolyte that covers at least a portion of the dielectric layer is formed using a first treatment solution that contains a self-doped conductive polymer. The first solid electrolyte is formed by, for example, applying the first treatment solution to the dielectric layer to cover at least a portion of the dielectric layer, and drying the first treatment solution.

The first treatment solution may be applied to the dielectric layer by, for example, immersing the anode body on which the dielectric layer has been formed in the first treatment solution, or injecting first treatment solution into the anode body on which the dielectric layer has been formed. The method is not limited to the impregnation or the injection, and a known application method (for example, a spay coating method) or a printing method may also be used. These methods may be combined where necessary.

The application of the first treatment solution and the drying of the first treatment solution may be performed only once, or may be alternately repeated a plurality of times. For details of the self-doped conductive polymer and the additive, see the description of the first solid electrolyte or the solid electrolyte layer given above.

The self-doped conductive polymer can be obtained by, for example, polymerizing (for example, oxidatively polymerizing) a self-doped conductive polymer precursor in a liquid medium. As the precursor, at least one selected from the group consisting of a monomer that constitutes the self-doped conductive polymer, an oligomer in which monomers are connected, and a prepolymer can be used. Where necessary, when generating the self-doped conductive polymer, at least one of a different conjugated polymer and a different dopant may be present together therewith.

Examples of the liquid medium that can be used to polymerize the self-doped conductive polymer include water and an organic liquid medium. As used herein, the term "liquid medium" refers to, for example, a medium that is in a liquid form at room temperature (at a temperature of 20° C. or more and 35° C. or less). Examples of the organic liquid medium include a monohydric alcohol (methanol, ethanol, propanol, aid the like), a polyvalent alcohol (ethylene glycol, glycerin, and the like), and an aprotic polar solvent (N,N-dimethylfomamide, dimethyl sulfoxide, acetonitrile, acetone, benzonitrile, and the like). The liquid media may be used alone or in a combination of two or more.

The first treatment solution is prepared by dispersing or dissolving constituent components of the first treatment solution in a liquid medium. Examples of the constituent components include a self-doped conductive polymer, an additive, and the like.

Examples of the liquid medium that can be used in the fast treatment solution include water and an organic medium. The liquid medium may be in a liquid form at a temperature at winch at least the first treatment solution is applied to the porous portion, or may be in a liquid form at room temperature (for example, 20° C. or more and 35° C. or less). Examples of the organic medium include an aliphatic alcohol, an aliphatic ketone (acetone and the like), a nitrile (acetonitrile, benzonitrile and the like), an amide (N,N-dimethylformamide and the like), a sulfoxide (dimethyl sulfoxide and the like), and the like. The aliphatic alcohol may be a monool or a polyol. The first treatment solution may contain one or a combination of two or more of the liquid media listed above.

When the first treatment solution contains a self-doped conductive polymer in the form of particles, from the viewpoint of ease of filling the pores of the porous portion with the first treatment solution, the average particle size of the self-doped conductive polymer particles may be 100 nm or less, 50 nm or less, or less than 10 nm. The lower limit of the average particle size is, but is not particularly limited to, for example, 0.5 nm or more.

As used herein, the term "the average particle size of the self-doped conductive polymer" refers to a cumulative 50% particle size (median) in a volume-based particle size distribution. The avenge particle size of the self-doped conductive polymer can be determined from a volume-based particle size distribution obtained based on the dynamic light scattering method (DLS). Specifically, the average particle size of the self-doped conductive polymer can be determined by subjecting a self-doped conductive polymer particles-containing aqueous dispersion (for example, the first treatment solution) to measurement using a particle size distribution measurement apparatus based on the dynamic light scattering method. As the particle size distribution measurement apparatus based on the dynamic light scattering method, for example, Light Scattering Spectrophotometer DLS-8000 available from Otsuka Electronics Co., Ltd. is used.

The first treatment solution may contain one or a combination of two or more self-doped conductive polymers. The first treatment solution may contain one or a combination of two or more additives.

The concentration of the self-doped conductive polymer in the first treatment solution is, for example, 0.5 mass % or more and 4 mass % or less, and may be 1 mass % or more and 4 mass % or less. When the concentration is within this range, the self-doped conductive polymer can be easily attached to a large area of the surface of the dielectric layer while causing the self-doped conductive polymer to permeate into fine recesses of the surface of the dielectric layer.

When the first treatment solution contains an ionic liquid, by the action of anions contained in the ionic liquid, the conductive polymer aggregates, which remarkably increases the viscosity of the first treatment solution, and thus the permeability of the first treatment solution into the fine recesses of the porous portion tends to be low. For this reason, it is preferable that the first treatment solution does not contain an ionic liquid. As used herein, the expression "the first treatment solution does not contain an ionic liquid" encompasses the case where the first treatment solution contains an ionic liquid in an amount less than or equal to the detection limit.

The drying after application of the first treatment solution to the dielectric layer may be performed under heat or under reduced pressure. The drying temperature, pressure, and time are determined according to, for example, die type of liquid medium contained in the first treatment solution.

(Second Sub-Step)

In the second sub-step, a solid electrolyte 2A that covers at least a portion of the first solid electrolyte is formed. More specifically, the solid electrolyte 2A is formed by, for example, applying a liquid dispersion (liquid dispersion 2A) that contains a conductive polymer 2A for constituting the solid electrolyte 2A to a surface of the first solid electrolyte and drying the liquid dispersion. Where necessary, the application of the liquid dispersion 2A and the drying of the liquid dispersion 2A may be repeated a plurality of times.

Where necessary, an aggregation agent (for example, a cation or a combination of a cation and an anion) may be applied to the surface of the first solid electrolyte after the first sub-step and prior to the second sub-step. Also, when the application of the liquid dispersion 2A is performed a plurality of times in the second sub-step, where necessary, prior to the application of the liquid dispersion 2A, the aggregation agent may be applied to the surface of the already formed solid electrolyte 2A.

The application of the liquid dispersion 2A may be performed in the same manner as in the case of the first treatment solution. For example, the liquid dispersion 2A may be applied to the surface of the first solid electrolyte or the surface of the already formed solid electrolyte 2A through at least one selected from among immersion, injection, application, and printing.

The conductive polymer 2A used in the liquid dispersion 2A can be obtained by polymerizing a conjugated polymer precursor in the presence of a dopant. Examples of the conjugated polymer precursor include a raw material monomer for conjugated polymer, an oligomer or prepolymer in which a plurality of molecular chains of the mw material monomer are connected, and the like. These precursors may be used alone or in a combination of two or more. The liquid dispersion 2A is prepared by dispersing the conductive polymer 2A in a liquid medium. The liquid dispersion 2A may contain an additive. For details of the conjugated polymer, the dopant, and the additive, see the description of the second solid electrolyte layer or the solid electrolyte layer given above. The liquid medium that can be used in the liquid dispersion 2A may be selected from among the liquid media listed above for the first treatment solution.

The liquid dispersion 2A may contain one or a combination of two or more of the conjugated polymers listed above. The liquid dispersion 2A may contain one or a combination of two or more of the dopants listed above. The liquid dispersion 2A may contain one or a combination of two or more of the additives listed above.

The concentration of the conductive polymer 2A in the liquid dispersion 2A is, for example, 1 mass % or more and 5 mass % or less, and may be 1 mass % or more and 4 mass % or less. When the concentration is within this range, it is possible to cause the liquid dispersion 2A to easily permeate into the pores of the porous portion and fill the pores of the porous portion with the liquid dispersion 2A at a high density.

In the liquid dispersions 2A to 2C, the average particle size Da of the conductive polymer 2A, the average particle size Db of the conductive polymer 2B, and the average particle size Dc of the conductive polymer 2C may satisfy $Da \leq Db < Dc$, and preferably satisfy $Da < Db < Dc$. By setting the average particle size of the conductive polymer in the liquid dispersion to be smaller as the liquid dispersion forms a more inner solid electrolyte, the pores of the porous portion and the recesses of the surface of the first solid electrolyte can be filled with the conductive polymer at a high density, and it is therefore advantageous in terms of forming a more uniform second solid electrolyte layer. Also, by setting the average particle size of the conductive polymer in the liquid dispersion to be larger as the liquid dispersion forms a more outer solid electrolyte, the thickness of the solid electrolyte layer is likely to be increased. For this reason, it is advantageous in terms of ensuring a higher level of withstand voltage properties.

The average particle size Da of the conductive polymer 2A contained in the liquid dispersion 2A is, for example, 10 or more and 400 nm or less, and may be 20 nm or more and 300 nm or less, or 20 nm or more and 100 nm or less (or 50 nm or less). It is advantageous to set the average particle size within this range in terms of enhancing the filling properties of the pores of the porous portion or the recesses of the surface of the first solid electrolyte with the conductive polymer 2A. The average particle size of the conductive polymer 2A can be determined in the same procedure as that of the self-doped conductive polymer.

When the liquid dispersion 2A contains an ionic liquid, by the action of anions contained in the ionic liquid, the conductive polymer aggregates, which remarkably increases the viscosity of die liquid dispersion 2A, aid thus the permeability of the liquid dispersion 2A into die fine recesses of the porous portion tends to be low. For this reason, it is preferable that the liquid dispersion 2A does not contain an ionic liquid. As used herein, the expression "the liquid dispersion 2A does not contain an ionic liquid" encompasses the case where the liquid dispersion 2A contains an ionic liquid in an amount less than or equal to the detection limit.

The drying after application of the liquid dispersion 2A may be performed under heat or under reduced pressure. The drying temperature, pressure, and time are determined according to, for example, the type of liquid medium contained in the liquid dispersion 2A.

(Third Sub-Step)

In the third sub-step, a solid electrolyte 2B that covers at least a portion of the solid electrolyte 2A is formed. More specifically, the solid electrolyte 2B is formed by, for example, applying a liquid dispersion (liquid dispersion 2B) that contains a conductive polymer 2B for constituting the solid electrolyte 2B to a surface of the solid electrolyte 2A and drying the liquid dispersion. Where necessary, the application of the liquid dispersion 2B and the drying of the liquid dispersion 2B may be repeated a plurality of times.

When the application of the liquid dispersion 2B is performed a plurality of times in the third sub-step, where necessary, prior to the application of the liquid dispersion 2B, an aggregation agent may be applied to the surface of the already formed solid electrolyte 2B.

The application of the liquid dispersion 2B may be performed in the same manner as in the case of the first treatment solution. For example, the liquid dispersion 2B may be applied to the surface of the solid electrolyte 2A or the surface of the already formed solid electrolyte 2B through at least one selected from among immersion, injection, application, and printing.

The conductive polymer 2B used in the liquid dispersion 2B can be obtained in the same manner as in the case of the conductive polymer 2A. The liquid dispersion 2B is prepared in the same manner as in the case of the liquid dispersion 2A. The liquid dispersion 2B may contain an additive. For details of the conjugated polymer, the dopant, and the additive, see the description of the second solid electrolyte layer or die solid electrolyte layer given above. The liquid medium that can be used in the liquid dispersion 2B may be selected from among the liquid media listed above for the first treatment solution.

The liquid dispersion 2B may contain one or a combination of two or more of the conjugated polymers listed above. The liquid dispersion 2B may contain one or a combination of two or more of the dopants listed above. The liquid dispersion 2B may contain one or a combination of two or more of the additives listed above.

The concentration of the conductive polymer 2B in the liquid dispersion 2B is, for example, 1 mass % or more and 5 mass % or less, and may be 1 mass % or more and 4 mass % or less. When the concentration is within this range, it is possible to cause the liquid dispersion 2B to easily permeate into the recesses of the surface of the solid electrolyte 2A. and fil the recesses of the surface of the solid electrolyte 2A with the conductive polymer 2B at a high density. Also, a solid electrolyte 2B with a certain level of thickness is likely to be obtained.

The average particle size Db of the conductive polymer 2B contained in the liquid dispersion 2B is greater than or equal to the average particle size Da (or may be greater than the average particle size Da) and less than the average particle size Dc. The average particle size Db of the conductive polymer 2B can be determined in the same procedure as the average particle size of the self-doped conductive polymer.

For the same reason as that of the liquid dispersion 2A, it is preferable that the liquid dispersion 2B does not contain an ionic liquid (or contains an ionic liquid in an amount less than or equal to the detection limit).

The drying after application of the liquid dispersion 2B may be performed under heat or under reduced pressure. The drying temperature, pressure, and time are determined according to, for example, the type of liquid medium contained in the liquid dispersion 2B.

(Fourth Sub-Step)

In the fourth sub-step, a solid electrolyte 2C that covers at least a portion of the solid electrolyte 2B is formed. More specifically, the solid electrolyte 2C is formed by, for example, applying a liquid dispersion (liquid dispersion 2C) that contains a conductive polymer 2C for constituting the solid electrolyte 2C to a surface of the solid electrolyte 2B, and drying the liquid dispersion. Where necessary, the application of the liquid dispersion 2C and the drying of the liquid dispersion 2C may be repeated a plurality of times.

When the application of the liquid dispersion 2C is performed a plurality of times in the fourth sub-step, where necessary, prior to the application of the liquid dispersion 2C, an aggregation agent may be applied to the surface of the already formed solid electrolyte 2C.

The application of the liquid dispersion 2C may be performed in the same manner as in the case of the first treatment solution. For example, the liquid dispersion 2C may be applied to the surface of the solid electrolyte 2B or the surface of the already formed solid electrolyte 2C through at least one selected from among immersion, injection, application, and printing.

The conductive polymer 2C used in the liquid dispersion 2C can be obtained in the same manner as in the case of the conductive polymer 2A. The liquid dispersion 2C is prepared in the same manner as in the case of the liquid dispersion 2A e liquid dispersion 2C may contain an additive. For details of the conjugated polymer, the dopant, the sticky component, and the additive, see the description of the second solid electrolyte layer or the solid electrolyte layer given above. The liquid medium that can be used in the liquid dispersion 2C may be selected from among the liquid media listed above for the first treatment solution.

The liquid dispersion 2C may contain one or a combination of two or more of the conjugated polymers listed above. The liquid dispersion 2C may contain one or a combination of two or more of the dopants listed above. The liquid dispersion 2C may contain one or a combination of two or more of the additives listed above.

The concentration of the conductive polymer 2C in the liquid dispersion 2C is, for example, 1 mass % or more and 10 mass % or less, and may be 1 mass % or more and 4 mass % or less. When the concentration is within this range, a more uniform solid electrolyte 2C with a certain level of thickness is likely to be obtained.

The average particle size Dc of the conductive polymer 2C contained in the liquid dispersion 2C is 200 in or more and 800 nm or less, and may be 300 nm or more and 600 nm or less. The average particle size of die conductive polymer 2C can be determined in the same procedure as that of the self-doped conductive polymer.

For the same reason as that of the liquid dispersion 2A, it is preferable that the liquid dispersion 2C does not contain an ionic liquid (or contains an ionic liquid in an amount less than or equal to the detection limit).

The drying after application of the liquid dispersion 2C may be performed under heat or under reduced pressure. The drying temperature, pressure, and time are determined according to, for example, the type of liquid medium contained in the liquid dispersion 2C. Where necessary, the drying may be performed at an increased temperature or in multiple stages.

(Fifth Sub-Step)

The fifth sub-step is performed between the second sub-step and the third sub-step, and a treatment solution (second treatment solution) that contains an ionic liquid is applied to the surface of the solid electrolyte 2A and dried. Through the fifth sub-step, the ionic liquid permeates into the solid electrolyte 2A and also attaches to the surface of the solid electrolyte 2A. On the surface of the solid electrolyte 2A in this state, a solid electrolyte 2B is formed in the third sub-step. By doing so, a relatively large amount of die ionic liquid can be distributed at the interface (second interface) between the solid electrolyte 2A and the solid electrolyte 2B. Also, a large amount of the ionic liquid can be held in the solid electrolyte 2A. Accordingly, the withstand voltage properties of the solid electrolytic capacitor can be enhanced. By a large amount of the ionic liquid being held in the second interface or the solid electrolyte 2A located at a position relatively close to the dielectric layer, a high level of film repairability of the dielectric layer can be ensured, and thus the effect of suppressing a leakage current can be enhanced.

The second treatment solution may contain, for example, the ionic liquid and a liquid medium. The liquid medium used in the second treatment solution may be selected from among the liquid media listed above as examples for the first treatment solution or the liquid dispersion 2A. It is preferable to use a liquid medium that is compatible with the ionic liquid according to the type of ionic liquid. When the second treatment solution contains a conductive polymer, by the action of anions contained in the ionic liquid, the conductive polymer aggregates, which remarkably increases the viscosity of the second treatment solution, and thus the permeability of the second treatment solution into the solid electrolyte 2A tends to be low. For this reason, it is preferable that the second treatment solution does not contain a conductive polymer (including a conjugated polymer, a dopant, and the like). As used herein, the expression “the second treatment solution does not contain a conductive polymer” encompasses die case where the second treatment solution contains a conductive polymer in an amount less than or equal to the detection limit.

The second treatment solution may be applied to the surface of the solid electrolyte 2A in the same manner as in the case of the first treatment solution through, for example, at least one selected from among immersion, injection, application, and printing. From the viewpoint of ease of ensuring a high level of withstand voltage properties, the ionic liquid is preferably attached to cover the entire surface of the underlying solid electrolyte 2A (or the entire surface of a cathode forming portion of the anode body).

The concentration of the ionic liquid in the second treatment solution is, for example, 1 mass % or more and 50 mass % or less, and may be 2.5 mass % or more and 25 mass % or less (or 20 mass % or less). In the above-described range, the lower limit value may be set to 5 mass % or more or 10 mass % or more. When the concentration of the ionic liquid is within this range, a large amount of the ionic liquid can be distributed in the second interface, and also, a large amount of the ionic liquid is likely to be held in the solid electrolyte 2A.

After the application of the second treatment solution to the surface of the solid electrolyte 2A, dry processing is performed. The dry processing may be performed under heat or under reduced pressure. The drying temperature and pressure are determined according to, for example, the type of liquid medium and the type of ionic liquid contained in the second treatment solution. Through the dry processing, a large amount of the ionic liquid can be distributed in the second interface, and also, a large amount of the ionic liquid is likely to be held in solid electrolyte 2A.

(Sixth Sub-Step)

The sixth sub-step is performed between the third sub-step and the fourth sub-step, and a third treatment solution that contains an ionic liquid is applied to the surface of the solid electrolyte 2B and dried. At least one of the fifth sub-step and the sixth sub-step may be performed, or both of the fifth sub-step and the sixth sub-step may be performed.

Through the sixth sub-step, the ionic liquid permeates into the solid electrolyte 2B and also attaches to the surface of the solid electrolyte 2B. On the surface of the solid electrolyte 2B in this state, a solid electrolyte 2C is formed in the fourth sub-step. By doing so, a relatively large amount of the ionic liquid can be distributed at the interface (third interface) between the solid electrolyte 2B and the solid electrolyte 2C. Also, a large amount of the ionic liquid can be held in the solid electrolyte 2B. Accordingly, the withstand voltage properties of the solid electrolytic capacitor can be enhanced. By a large amount of the ionic liquid being held in the third interface or the solid electrolyte 2B located at a position relatively close to the dielectric layer, a high level of film repairability of the dielectric layer can be ensured, and thus the effect of suppressing a leakage current can be enhanced.

The third treatment solution may contain, for example, the ionic liquid and a liquid medium. The liquid medium used in the third treatment solution may be selected from among the liquid media listed above as examples for the first treatment solution or the liquid dispersion 2A. It is preferable to use a liquid medium that is compatible with the ionic liquid according to the type of ionic liquid. For the same reason as that of the second treatment solution, it is preferable that the third treatment solution does not contain a conductive polymer (including a conjugated polymer, a dopant, and the like)(or contains a conductive polymer in an amount less than or equal to die detection limit).

When performing the fifth sub-step and the sixth sub-step, the second treatment solution and the third treatment solution may have the same composition or different compositions. For example, the second treatment solution and the third treatment solution may contain the same type of ionic liquid or different types of ionic liquids. The second treatment solution and the third treatment solution may have the same concentration of the ionic liquid or different concentrations of the ionic liquid. The second treatment solution and the third treatment solution may contain the same type of liquid medium or different types of liquid media.

The third treatment solution may be applied to the surface of the solid electrolyte 2B in the same manner as in the case of the first treatment solution through, for example, at least one selected from among immersion, injection, application, and printing. From the viewpoint of ease of ensuring a high level of withstand voltage properties, the ionic liquid is preferably attached to cover the entire surface of the underlying solid electrolyte 2B (or the entire surface of a cathode forming portion of the anode body).

The concentration of the ionic liquid in the third treatment solution may be selected from among the concentrations listed above for the ionic liquid in the second treatment solution. When the concentration of the ionic liquid is within this range, a large amount of the ionic liquid can be distributed in the third interface, and also, a large amount of the ionic liquid is likely to be held in the solid electrolyte 2B.

After the application of the third treatment solution to the surface of the solid electrolyte 2B, dry processing is performed. The dry processing may be performed under heat or under reduced pressure. The drying temperature and pressure are determined according to, for example, the type of liquid medium and the type of ionic liquid contained in the third treatment solution. Through the dry processing, a large amount of the ionic liquid can be distributed in the third interface, and also, a large amount of the ionic liquid is likely to be held in the solid electrolyte 2B.

Through the process described above, a solid electrolyte layer is formed.

From the viewpoint of ensuring a high level of adhesion between the solid electrolyte 2C and the cathode lead-out layer (or a portion thereof) as well as suppressing an increase in interface resistance in the interface (fourth interface) between the solid electrolyte 2C and the cathode lead-out layer, it is preferable that an ionic liquid (a treatment solution that contains an ionic liquid or the like) is not applied to the surface of the solid electrolyte 2C. For this reason, the distribution amount of the ionic liquid in the fourth interface is far less than the distribution amount of the ionic liquid in the second interface or the third interface, and may be less than or equal to the detection limit.

Also, by applying an ionic liquid to the surface of the first solid electrolyte, the film repairability of the dielectric layer can be enhanced to some extent, and a leakage current can be suppressed. However, the first solid electrolyte is merely provided in a portion of the solid electrolyte layer that is on the most inner side, and thus even when there is a large amount of the ionic liquid in the first solid electrolyte or the interface (first interface) between the first solid electrolyte and the second solid electrolyte layer (more specifically, the solid electrolyte 2A), the effect of enhancing the resistance of the solid electrolyte layer is unlikely to be obtained. In addition, due to the ionic liquid, the permeability of the liquid dispersion 2A into the pores of the porous portion tends to be low. For this reason, from the viewpoint of ensuring a higher level of withstand voltage properties, an ionic liquid (or a treatment solution that contains an ionic liquid) does not necessarily need to be applied to the first solid electrolyte prior to the second sub-step.

(Cathode Lead-Out Layer)

The cathode lead-out layer includes, for example, a first layer that is in contact with the solid electrolyte layer and covers at least a portion of the solid electrolyte layer. The cathode lead-out layer may include the first layer and a second layer that covers the first layer. The first layer may be, for example, a layer that contains conductive particles, a metal foil, or the like. As the conductive particles, for example, at least one selected from conductive carbon and a metal powder can be used. The cathode lead-out layer may be constituted of for example, a conductive carbon-containing layer (also referred to as a "carbon layer") as the first layer and a metal powder-containing layer or a metal foil as the second layer. When a metal foil is used as the first layer, the cathode lead-out layer may be constituted only of the metal foil. The cathode lead-out layer can be formed using a known method according to the layer configuration.

As the conductive carbon, for example, graphite (artificial graphite, natural graphite, or the like) can be used.

The metal powder-containing layer as the second layer can be formed by, for example, layering a metal powder-containing composition on the surface of the first layer. The second layer may be, for example, a metal paste layer (a silver paste layer or the like) formed using a composition that contains a metal powder such as silver particles and a resin (a binder resin). As the resin, it is possible to use a thermoplastic resin, but it is preferable to use a thermosetting resin such as an imide-based resin or an epoxy resin.

When a metal foil is used as the first layer, there is no particular limitation on the type of metal, but it is preferable to use a valve metal such as aluminum, tantalum, or niobium, or an alloy that contains the valve metal. Where necessary, die surface of the metal foil may be roughened. A chemical conversion coating film, a coating film made of a metal (dissimilar metal) different from the metal that constitutes the metal foil, or a coating film made of a non-metal may be formed on the surface of the metal foil. Examples of the dissimilar metal and the non-metal include a metal such as titanium, a non-metal such as carbon (conductive carbon or the like), and the like.

The dissimilar metal coating film or die non-metal (for example, conductive carbon) coating film may be used as the first layer; and the metal foil may be used as the second layer.

The method for producing a capacitor element includes a third step of forming a cathode lead-out layer to cover at least a portion of the solid electrolyte layer. The method for producing a capacitor element may also include, for example, a step of forming a cathode lead-out layer (for example, a first layer) that covers at least a portion of the solid electrolyte 2C.

(Others)

A solid electrolytic capacitor includes at least one capacitor element and an exterior body that seals the at least one capacitor element. The solid electrolytic capacitor may include two or more capacitor elements. The solid electrolytic capacitor may be a wound solid electrolytic capacitor, a chip solid electrolytic capacitor, or a stacked solid electrolytic capacitor For example, the solid electrolytic capacitor may include two or more wound capacitor elements, or two or more stacked capacitor elements. The configuration of the capacitor element can be selected according to the type of solid electrolytic capacitor.

In the capacitor element, one end portion of a cathode lead is electrically connected to the cathode lead-out layer. One end portion of an anode lead is electrically connected to the anode body. The other end portion of the anode lead and the other end portion of the cathode lead are drawn out of the resin exterior body or the case. The other end portion of each lead exposed from the resin exterior body or the case is used to connect, using solder, to a substrate on which the solid electrolytic capacitor is to be mounted, or the like. As the leads, lead wires or lead frames may be used.

The solid electrolytic capacitor can be obtained based on a production method that includes, for example, a first step, a second step, mid a third step, the production method including a step of forming at least one capacitor element and a step of sealing at least one solid electrolytic capacitor element with an exterior body. For example, when producing a solid electrolytic capacitor that includes two or more stacked capacitor elements, the production method further includes, prior to the sealing step, a step of stacking the two or more capacitor elements. In the sealing step, the two or more stacked capacitor elements are sealed with the exterior body.

The exterior body also encompasses a case. The exterior body may contain a resin. The capacitor element may be sealed with a resin exterior body by, for example, placing the capacitor element and a material resin (for example, an uncured thermosetting resin and a filler) for forming the exterior body in a mold and subjecting the mold to transfer molding, compression molding or the like. At this time, the other end side portion of the anode lead and the other end side portion of the cathode lead that have been drawn out of the capacitor element are exposed from the mold. Also, the capacitor element may be housed in a bottomed case such that the other end side portion of the anode lead and the other end side portion of the cathode lead are located on the opening side of the bottomed case, and the opening of the sealed bottomed case may be sealed to form a solid electrolytic capacitor.

The solid electrolytic capacitor may further include a case provided outside of the resin exterior body where necessary. The resin material for constituting the case may be a thermoplastic resin, a composition that contains a thermoplastic resin, or the like. The metal material for constituting the case may be, for example, a metal such as aluminum, copper, or iron, or an alloy thereof (including stainless steel, bass, or the like).

FIG. 1 is a schematic cross-sectional view of a solid electrolytic capacitor according to an embodiment of the present disclosure. A solid electrolytic capacitor 100 shown in FIG. 1 includes a capacitor element 110, an exterior body 150, an anode lead terminal 210, and a cathode lead terminal 220. The exterior body 150 is provided to cover a portion of the anode lead terminal 210, a portion of the cathode lead terminal 220, and the capacitor element 110.

The capacitor element 110 includes an anode portion 111, a dielectric layer 114, and a cathode portion 115. The anode portion 111 includes an anode body 113 and an anode wire 112. The anode body 113 is a rectangular parallelepiped shaped porous sintered body, and the dielectric layer 114 is formed on the surface of the anode body 113. A portion of the anode wire 112 protrudes from one end face of the anode body 113 toward a front face **100*f* of the solid electrolytic capacitor 100. The other portion of the anode wire 112 is embedded in the anode body 113**.

The cathode portion 115 includes: a solid electrolyte layer 116 provided to cover at least a portion of the dielectric layer 114; and a cathode lead-out layer 117 formed on the solid electrolyte layer 116. The cathode lead-out layer 117 includes: for example, a carbon layer formed on the solid electrolyte layer 116; and a metal particle layer formed on the carbon layer. The metal particle layer is, for example, a metal paste layer (for example, a silver paste layer) formed using a metal paste.

The solid electrolyte layer 116 contains, as described above, an ionic liquid, and also includes: a first solid electrolyte that coves at least a portion of the dielectric layer 114; and a second solid electrolyte layer that covers at least a portion of the first solid electrolyte. The fast solid electrolyte contains a self-doped conductive polymer. The second solid electrolyte layer includes at least a solid electrolyte 2A that coves at least a portion of the first solid electrolyte, a solid electrolyte 2B that covers at least a portion of the solid electrolyte 2A, and a solid electrolyte 2C that covers at least a portion of the solid electrolyte 2B. The cathode portion 115 includes a layer that coves at least a portion of the solid electrolyte 2C. Here, an interface between the first solid electrolyte and the solid electrolyte 2A, an interface between the solid electrolyte 2A and the solid electrolyte 2B, an interface between the solid electrolyte 2B and the solid electrolyte 2C, and an interface between the solid electrolyte 2C and the layer that coves at least a portion of the solid electrolyte 2C will be referred to as "first to fourth interfaces", respectively. Out of these interfaces, the second interface or the third interface has the largest distribution amount of the ionic liquid. With this configuration, the leakage current can be kept low while ensuring a high level of withstand voltage properties. From the viewpoint of obtaining a higher effect, in the solid electrolyte layer 116, the solid electrolyte 2A or the solid electrolyte 2B may have the largest distribution amount of the ionic liquid.

The anode lead terminal 210 includes an anode terminal portion 211 and a wire connection portion 212. The anode terminal portion 211 is exposed at a bottom 100*b* of the solid electrolytic capacitor 100. The wire connection portion 212 is connected to the anode wire 112. The cathode lead terminal 220 includes a cathode terminal portion 221 and a connection portion 222. The cathode terminal portion 221 is exposed at the bottom 100*b* of the solid electrolytic capacitor 100. The connection portion 222 is electrically connected to the cathode lead-out layer 117 (the cathode portion 115) via a conducive layer 141.

EXAMPLES

Hereinafter, the present invention will be described specifically based on examples and comparative examples. However, the present invention is not limited to the examples given below.

Examples 1 and 2 and Comparative Examples 1 and 2

Solid electrolytic capacitors were produced and then subjected to characteristics evaluation in the manner described below.

(1) Preparation of Anode Body Including Dielectric Layer

A tantalum sintered body (porous body) with a portion of an anode wire embedded therein was prepared as an anode body By anodizing the surface of the tantalum sintered body, a dielectric layer containing tantalum oxide was formed on the surface of the anode body.

(2) Formation of First Solid Electrolyte

An aqueous dispersion (first treatment solution) containing a self-doped polythiophene-based polymer was prepared. The concentration of the polythiophene-based polymer in the first treatment solution was set to 1 to 4 mass %. The polythiophene-based polymer particles were very small particles with a particle size of less than 10 nm. As the self-doped polythiophene-based polymer, PEDOT (Mw: about 10,000) having a sulfo group bonded to a PEDOT backbone via a linking group including a butylene group was used.

The tantalum sintered body prepared in the step (1) described above was immersed in the first treatment solution for about 30 to 60 seconds, and then taken out of the dispersion liquid. Next, the tantalum sintered body that had been taken out of the dispersion liquid was heated at 140 to 180° C. for 10 to 20 minutes to form a first solid electrolyte.

(3) Formation of Second Solid Electrolyte Layer (a) Formation of Solid Electrolyte 2A A solid electrolyte 2A was formed using a liquid dispersion 2A Specifically, first, the tantalum sintered body in which the first solid electrolyte had been formed was immersed in a liquid dispersion 2A for about 30 to 60 seconds, and then the tantalum sintered body was taken out of the liquid dispersion 2A. Next, the tantalum sintered body that had been taken out of the liquid dispersion 2A was heated at 140 to 180° C. for 10 to 20 minutes to form a solid electrolyte 2A. As the liquid dispersion 2A, an aqueous dispersion containing a conductive polymer 2A (PSS-doped PEDOT) at a concentration of 1 to 4 mass % (the conductive polymer contained in the dispersion liquid had an average particle size of 20 to 30 nm) was used.

(b) Formation of Solid Electrolyte 2B

A solid electrolyte 2B was formed using a liquid dispersion 2B. Specifically, first, die tantalum sintered body in which the solid electrolyte 2A had been formed was immersed in a liquid dispersion 2B for about 30 to 60 seconds and then the tantalum sintered body was taken out of the liquid dispersin 2B. Next, the tantalum sintered body that had been taken out of the liquid dispersion 2B was heated at 140 to 180° C. for 10 to 20 minutes to forma solid electrolyte 2B. As the liquid dispersion 2B, an aqueous dispersion containing a conductive polymer 2B (PSS-doped PEDOT) at a concentration of 1 to 4 mass % (the conductive polymer contained in the dispersion liquid had an average particle size of 20 to 30 nm) was used.

(c) Formation of Solid Electrolyte 2C

A solid electrolyte 2C was formed using a liquid dispersion 2C. Specifically, first, the tantalum sintered body in which the solid electrolyte 2B had been formed was immersed in a liquid dispersion 2C for about 30 to 60 seconds, and then the tantalum sintered body was taken out of the liquid dispersion 2C. Next, the tantalum sintered body that had been taken out of the liquid dispersion 2C was heated at 60 to 100° C. for 10 to 20 minutes, and then further heated at 140 to 180° C. for 10 to 20 minutes to form a solid electrolyte 2C. As the liquid dispersion 2C. an aqueous dispersion containing a conductive polymer 2C (PSS-doped PEDOT) at a concentration of 1 to 4 mass % (the conductive polymer contained in the dispersion liquid had an average particle size of 300 to 500 nm) and a sticky component was used.

In the manner described above, a second solid electrolyte layer including the solid electrolytes 2A to 2C was formed, mid a solid electrolyte layer constituted of the fast solid electrolyte and the second solid electrolyte layer was formed.

(4) Application of Ionic Liquid

In the step of forming the solid electrolyte layer, the tantalum sintered body in which the solid electrolyte has been formed was immersed in an ionic liquid-containing treatment solution under reduced pressure for 10 to 20 minutes. After the pressure was returned to the atmospheric pressure, the tantalum sintered body was further immersed for about 5 to 10 minutes, and then taken out of the treatment solution. Next, the tantalum sintered body that had been taken out of the treatment solution was heated at 100 to 150° C. for 10 to 30 minutes. In this way, dry processing was performed. As the ionic liquid-containing treatment solution, a solution prepared by dissolving 1-butyl-2-methyl imidazolium hydrogen sulfate in pure water at a concentration of 20 mass % was used. The timing at which the treatment solution was applied is shown in Table 1. In Comparative Example 1, the ionic liquid-containing treatment solution was not applied.

(5) Formation of Cathode Lead-Out Layer

The tantalum sintered body in which the solid electrolyte layer had been formed was immersed in a dispersion liquid prepared by dispersing graphite particles in water, then taken out of the dispersion liquid, and dried to form a carbon layer (first layer) on the surface of the solid electrolyte layer. The drying was performed at 180° C. for 10 to 30 minutes.

Next, a silver paste containing silver particles and a binder resin(epoxy resin) was applied to the surface of the carbon layer, dried at 60 to 80° C. for 20 to 40 minutes, and further heated at 180° C. for 30 to 60 minutes to cure the binder resin. A metal paste layer (second layer) was thereby formed. In this way, a cathode lead-out layer constituted of the carbon layer and the metal paste layer was formed.

In the manner described above, a capacitor element including a cathode portion constituted of the solid electrolyte layer and the cathode lead-out layer was produced.

(6) Assembly of Solid Electrolytic Capacitor

The cathode lead-t layer of the capacitor element obtained in the step (5) described above and one end portion of a cathode lead terminal were bonded using a conductive adhesive. The anode body protruding from the capacitor element and one end portion of an anode lead terminal were bonded through laser welding.

Next, a resin exterior body made of an insulating resin was formed around the capacitor element using a transfer molding method. At this time, the other end portion of the anode lead terminal and the other end portion of the cathode lead terminal were drawn out of the exterior body.

In the manner described above, a total of twenty solid electrolytic capacitors were produced.

Comparative Example 3

A total of twenty solid electrolytic capacitors were produced in the same manner as in Example, 1, except that the solid electrolyte layer was formed in the following procedure, and the ionic liquid-containing treatment solution was not applied.

A solid electrolyte layer (inner layer) was formed on the surface of the dielectric layer of the tantalum sintered body in the following procedure using a chemical polymerization method. First, a polymerization solution was prepared by dissolving ferric p-toluene sulfonate (oxidant) and 3,4-ethylenedioxythiophene (EDOT) in ethanol.

The tantalum sintered body including the dielectric layer was immersed in a polymerization solution for about 3 to 10 seconds. Next, the tantalum sintered body was taken out of the reaction solution, and then heated at 210° C. for 3 minutes to polymerize EDOT. In this way, a solid electrolyte layer (inner layer) containing a conductive polymer containing PEDOT was formed.

Next a solid electrolyte 2C (outer layer) was formed using the liquid dispersion 2C. The solid electrolyte 2C was formed in the same manner as in the step (c) described under the item (3) of Example 1, except that the tantalum sintered body in which the solid electrolyte layer (inner layer) had been formed was used. In this way, a solid electrolyte layer including the inner layer and the outer layer was formed.

Evaluation

The solid electrolytic capacitors produced in Examples and Comparative Examples were subjected to the following evaluation tests.

(1) Initial Electrostatic Capacity and ESR

In an environment of 20° C., using a 4-terminal LCR meter for measurement, the initial electrostatic capacity (ρF) at a frequency of 120 Hz and the initial ESR (mΩ) at a frequency of 100 kHz of each solid electrolytic capacitor were measured. Then, the measurement values of the twenty solid electrolytic capacitors were averaged to obtain an average value. The initial electrostatic capacity and ESR are indicated by relative values, with the electrostatic capacity and the ESR of the solid electrolytic capacitors produced in Comparative Example 3 being set to 100.

(2) Leakage Current (LC)

A 1 kΩ resistor was connected in series to each solid electrolytic capacitor, and a leakage current (ρA) after a rated voltage of 35V was applied for 1 minute using a DC power supply was measured, and the measurement values of the twenty solid electrolytic capacitors were averaged to obtain an average value. The leakage current is indicated by a relative value, with the leakage current of the solid electrolytic capacitors produced in Comparative Example 3 being set to 100.

(3) Withstand Voltage Properties

Voltage was applied to each solid electrolytic capacitor by increasing the voltage at a rate of 1.0V/sec, and breakdown withstand voltage (V) at which an overcurrent of 0.5 A flowed was measured. The withstand voltage properties are indicated by a relative value, with the breakdown withstand voltage (V) of the solid electrolytic capacitors produced in Comparative Example 3 being set to 100. The greater the value, the higher the withstand voltage properties.

The evaluation results are shown in Table 1. In Table 1, E1 and E2 correspond to the solid electrolytic capacitors produced in Examples 1 and 2, respectively and C1 to C3 correspond to the solid electrolytic capacitors produced in Comparative Examples 1 to 3, respectively.

TABLE 1

| | Application of ionic liquid | Electrostatic capacity (relative value) | ESR (relative value) | LC (relative value) | Withstand voltage properties (relative value) |
|---|---|---|---|---|---|
| E1 | Applied between second sub-step and third sub-step | 107.4 | 81.4 | 12.8 | 168.7 |
| E2 | Applied between third sub-step and fourth sub-step | 107.4 | 77.0 | 16.7 | 158.6 |
| C1 | Not applied | 101.7 | 88.1 | 109.4 | 159.8 |
| C2 | Applied between first sub-step and second sub-step | 104.3 | 88.6 | 18.9 | 125.3 |
| C3 | Not applied | 100.0 | 100.0 | 100.0 | 100.0 |

As shown in Table 1, the solid electrolytic capacitor C1 produced without applying an ionic liquid exhibited improved withstand voltage properties as compared with that of the solid electrolytic capacitor C3 whose solid electrolyte layer was composed of the inner layer formed through chemical polymerization and the outer layer formed using the liquid dispersion, but the leakage current was greater than that of the solid electrolytic capacitor C3. Also, in the solid electrolytic capacitor C2 produced by applying and drying an ionic liquid-containing treatment solution between the first sub-step aid the second sub-step (or in other words, the first interface had the largest distribution amount of the ionic liquid out of the first to fourth interfaces), the leakage current was reduced significantly, but the withstand voltage properties were lower than those of the solid electrolytic capacitor C1, and thus the effect of improving the withstand voltage properties was limited. Also, the ESR of the solid electrolytic capacitor C2 was about the same as that of the solid electrolytic capacitor C1.

In contrast, in the solid electrolytic capacitor E2 produced by applying and drying an ionic liquid-containing treatment solution between the third sub-step and the fourth sub-step (or in other words, the third interface had the largest distribution amount of the ionic liquid out of the first to fourth interfaces), the leakage current was kept low while ensuring a high level of withstand voltage properties. Furthermore, in the solid electrolytic capacitor E1 produced by applying and drying an ionic liquid-containing treatment solution between the second sub-step and the third sub-step (or in other words, the second interface had die largest distribution amount of the ionic liquid out of the first to fourth interfaces), the leakage current was also low, and an even higher level of withstand voltage properties were ensured.

The present invention has been described in terms of the presently preferred embodiments, but the disclosure should not be interpreted as limiting. Various alterations and modifications will no doubt become apparent to those skilled in the art to which the invention pertains, after having read the disclosure. Accordingly, it is to be understood that the appended claims be interpreted as covering all alterations and modifications which fall within the true spirit and scope of the present invention.

INDUSTRIAL APPLICABILITY

With the solid electrolytic capacitor according to the present disclosure, a high level of withstand voltage properties can be ensured, and the leakage current can be kept low. Accordingly, the solid electrolytic capacitor according to the present disclosure is applicable to applications where a high level of withstand voltage properties is required, applications where a high level of reliability is required, and various other applications. However, the applications of the solid electrolytic capacitor according to the present disclosure are not limited thereto.

REFERENCE SIGNS LIST

100: solid electrolytic capacitor, 110: capacitor element, 113: anode body, 114: dielectric layer, 116: solid electrolyte layer

The invention claimed is:

1. A solid electrolytic capacitor element comprising:

an anode body that includes a porous portion at least at a surface layer of the anode body;

a dielectric layer formed on at least a portion of a surface of the porous portion; and a cathode portion that includes a solid electrolyte layer that covers at least a portion of the dielectric layer and a cathode lead-out layer that covers at least a portion of the solid electrolyte layer, wherein the solid electrolyte layer contains an ionic liquid, and includes a first solid electrolyte that covers at least a portion of the dielectric layer and a second solid electrolyte layer that covers at least a portion of the first solid electrolyte, the first solid electrolyte contains a self-doped conductive polymer, the second solid electrolyte layer includes: a solid electrolyte 2A that covers at least a portion of the first solid electrolyte; a solid electrolyte 2B that covers at least a portion of the solid electrolyte 2A; and a solid electrolyte 2C that covers at least a portion of the solid electrolyte 2B, and out of a first interface between the first solid electrolyte and the solid electrolyte 2A, a second interface between the solid electrolyte 2A and the solid electrolyte 2B, a third interface between the solid electrolyte 2B and the solid electrolyte 2C, and a fourth interface between the solid electrolyte 2C and the cathode lead-out layer, the second interface or the third interface has a largest distribution amount of the ionic liquid.

2. The solid electrolytic capacitor element in accordance with claim 1, wherein the second solid electrolyte layer contains a conjugated polymer and a dopant.

3. The solid electrolytic capacitor element in accordance with claim 1, wherein, out of the first interface, the second interface, the third interface, and the fourth interface, the second interface has a largest distribution amount of the ionic liquid.

4. The solid electrolytic capacitor element in accordance with claim 1, wherein, in the solid electrolyte layer, the solid electrolyte 2A or the solid electrolyte 2B has a largest distribution amount of the ionic liquid.

5. The solid electrolytic capacitor element in accordance with claim 1, wherein the ionic liquid is hydrophilic.

6. The solid electrolytic capacitor element in accordance with claim 1, wherein the ionic liquid contains $HSO_4^-$ ions.

7. A solid electrolytic capacitor comprising:

at least one solid electrolytic capacitor element, the at least one solid electrolytic capacitor element being the solid electrolytic capacitor element in accordance with claim 1; and an exterior body that seals the at least one solid electrolytic capacitor element.

8. A method for producing a solid electrolytic capacitor element, the solid electrolytic capacitor element including: an anode body that includes a porous portion at least at a surface layer of the anode body; a dielectric layer formed on at least a portion of a surface of the porous portion; and a cathode portion that includes a solid electrolyte layer that covers at least a portion of the dielectric layer and a cathode lead-out layer that covers at least a portion of the solid electrolyte layer, the method comprising:

a first step of preparing the anode body having the dielectric layer on the surface of the porous portion;

a second step of forming the solid electrolyte layer to cover at least the portion of the dielectric layer; and a third step of forming the cathode lead-out layer to cover at least the portion of the solid electrolyte layer, wherein the second step includes:

a first sub-step of forming a first solid electrolyte that covers at least a portion of the dielectric layer using a first treatment solution that contains a self-doped conductive polymer;

a second sub-step of forming a solid electrolyte 2A that covers at least a portion of the first solid electrolyte using a liquid dispersion 2A that contains a conductive polymer 2A;

a third sub-step of forming a solid electrolyte 2B that covers at least a portion of the solid electrolyte 2A using a liquid dispersion 2B that contains a conductive polymer 2B; and a fourth sub-step of forming a solid electrolyte 2C that covers at least a portion of the solid electrolyte 2B using a liquid dispersion 2C that contains a conductive polymer 2C, the second step also includes at least one of:

a fifth sub-step of applying a second treatment solution that contains an ionic liquid to a surface of the solid electrolyte 2A and drying the second treatment solution, performed between the second sub-step and the third sub-step; and a sixth sub-step of applying a third treatment solution that contains an ionic liquid to a surface of the solid electrolyte 2B and drying the third treatment solution, performed between the third sub-step and the fourth sub-step, and in the solid electrolytic capacitor element, out of a first interface between the first solid electrolyte and the solid electrolyte 2A, a second interface between the solid electrolyte 2A and the solid electrolyte 2B, a third interface between the solid electrolyte 2B and the solid electrolyte 2C, and a fourth interface between the solid electrolyte 2C and the cathode lead-out layer, the second interface or the third interface has a largest distribution amount of the ionic liquid.

9. The method for producing a solid electrolytic capacitor element in accordance with claim 8, wherein an average particle size Da of the conductive polymer 2A, an average particle size Db of the conductive polymer 2B, and an average particle size Dc of the conductive polymer 2C satisfy $Da \leq Db < Dc$.

10. The method for producing a solid electrolytic capacitor element in accordance with claim 8, wherein none of the first treatment solution, the liquid dispersion 2A, the liquid dispersion 2B, and the liquid dispersion 2C contains an ionic liquid.

11. The method for producing a solid electrolytic capacitor element in accordance with claim 8, wherein neither the second treatment solution nor the third treatment solution contains a conductive polymer.

* * * * *